US011607727B2

(12) United States Patent
Vader et al.

(10) Patent No.: US 11,607,727 B2
(45) Date of Patent: Mar. 21, 2023

(54) METAL POWDER MANUFACTURE USING A LIQUID METAL EJECTOR

(71) Applicant: XEROX CORPORATION, Norwalk, CT (US)

(72) Inventors: Scott J Vader, Pittsford, NY (US); Zachary S Vader, Pittsford, NY (US); Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 456 days.

(21) Appl. No.: 16/412,801

(22) Filed: May 15, 2019

(65) Prior Publication Data
US 2019/0351488 A1 Nov. 21, 2019

Related U.S. Application Data

(60) Provisional application No. 62/672,302, filed on May 16, 2018.

(51) Int. Cl.
*B22F 1/065* (2022.01)
*B22F 9/06* (2006.01)
(52) U.S. Cl.
CPC .............. *B22F 1/065* (2022.01); *B22F 9/06* (2013.01); *B22F 2999/00* (2013.01)
(58) Field of Classification Search
CPC ........ B22F 9/06; B22F 1/065; B22F 2999/00; B22F 2009/0892; B22F 9/082; B33Y 70/00
See application file for complete search history.

(56) References Cited

U.S. PATENT DOCUMENTS

| 4,741,464 | A | * | 5/1988 | Pinkerton | ........... B22D 11/0642 164/437 |
| 6,083,454 | A | * | 7/2000 | Tang | ......................... B01J 2/02 266/202 |
| 6,312,498 | B1 | | 11/2001 | Lee et al. | |
| 6,517,602 | B2 | * | 2/2003 | Sato | .................... B23K 35/0244 75/255 |

(Continued)

FOREIGN PATENT DOCUMENTS

CN 106925786 A * 7/2017 ............ B22F 1/0048

OTHER PUBLICATIONS

CN 106925786A, Qi et al., machine translation (Year: 2017).*
(Continued)

*Primary Examiner* — John A Hevey
(74) *Attorney, Agent, or Firm* — Maginot Moore & Beck LLP (57) ABSTRACT

An ejector of liquid material to form spherical particles includes a crucible for retaining liquid material, an orifice area defining at least one orifice, and an actuator responsive to a voltage signal for causing material to be ejected from the crucible through the orifice. A method comprises applying a voltage signal of a first type and a second type to the actuator, causing a material droplet of a first size and a second size to be ejected through the orifice. Alternately or in addition, the orifice area defines a first orifice having a first diameter and a second orifice having a second diameter different from the first diameter, whereby a signal causes a material droplet of a first size to be ejected through the first orifice and a material droplet of a second size to be ejected through the second orifice.

12 Claims, 11 Drawing Sheets

(56) References Cited

U.S. PATENT DOCUMENTS

| | | |
|---|---|---|
| 6,554,166 B2 | 4/2003 | Sato et al. |
| 7,029,624 B2 | 4/2006 | Orme-Marmerelis et al. |
| 7,097,687 B2 | 8/2006 | Chow |
| 7,297,178 B2 | 11/2007 | Kempf et al. |
| 8,960,833 B2 * | 2/2015 | Satou ................... B41J 2/04588 347/11 |
| 9,616,494 B2 | 4/2017 | Vader et al. |
| 10,040,119 B2 | 8/2018 | Vader et al. |
| 11,162,166 B2 * | 11/2021 | Kobayashi ................ C23C 2/06 |
| 2017/0087632 A1 * | 3/2017 | Mark ..................... B22D 11/01 |

OTHER PUBLICATIONS

"Optimizing powder packing behavior by controlling particle size and shape," Whitepaper, Malvern Instruments Limited, 2016, pp. 2-7.

\* cited by examiner

FIG. 13

METAL POWDER MANUFACTURE USING A LIQUID METAL EJECTOR

REFERENCE TO PROVISIONAL APPLICATION

Claim of priority is hereby made to U.S. Provisional Application 62/672,302, filed May 16, 2018.

BACKGROUND

Metal powders are made using a variety of techniques. Powdered metal can be milled, atomized, precipitated, or blended to proper consistency and texture for a specific use.

Metal powder for the 3D manufacturing technique called "powder bed fusion" has distinct requirements. The metal powder must flow well, and provide close packing of particles. A spherical particle shape is an important characteristic that leads to consistent and predictable powder dosing and layer formation.

The two main methods of metal powder production for powder bed fusion are currently gas atomization and plasma atomization. Gas atomization is probably the most common method of metal powder production: a molten metal pool is forced through a nozzle, then broken up with a stream of inert gas such as argon or nitrogen. The inert gas stream causes the molten metal to solidify, and the spherical particles are collected at the bottom of the chamber. Plasma atomization is generally used with high purity reactive metals with high melting points such as titanium alloy Ti6Al4V. Metal feedstock in wire form is fed into the top of an atomizer, and then melted using a plasma torch; as the molten metal falls it solidifies creating spherical particles. With these atomization methods, the powder particles are very spherical. However, the size and size distributions are not optimal. Post process classification are required to produce the final product for intended applications.

U.S. Pat. Nos. 9,616,494 and 10,040,119, incorporated by reference in their entireties for the teachings thereof, describe a magnetohydrodynamic (MHD) printer and process suitable for jetting liquid metal and its alloys. The patents describe an arrangement whereby current placed through a coil produces time-varying magnetic fields that induce eddy currents within a reservoir of liquid metal compositions. Coupling between magnetic and electric fields within the liquid metal results in Lorentz forces that cause ejection of droplets of the liquid metal compositions through a nozzle of controlled size, shape, and orifice. The process and apparatus described in these patents provide certain practical advantages. Wire feed stock may be used, as opposed to metal powder. The nozzles may be incorporated in a multi-nozzle printer architecture. However, the techniques described below can also be applied to any of the known similar technologies such as EHD, MHD, pneumatic or other methods.

SUMMARY

According to one aspect, there is provided a method of operating an ejector of liquid material to form spherical particles, the ejector having a crucible for retaining liquid material, structure associated with the crucible including an orifice area defining at least one orifice, and an actuator responsive to a voltage signal for causing material to be ejected from the crucible through the orifice. The method comprises applying a voltage signal of a first type to the actuator, causing a material droplet of a first predetermined size to be ejected through the orifice; and applying a voltage signal of a second type to the actuator, causing a material droplet of a second predetermined size to be ejected through the orifice.

According to another aspect, there is provided an ejector of liquid material suitable for forming spherical particles, comprising: a crucible for retaining liquid material; structure associated with the crucible including an orifice area defining a first orifice having a first diameter and a second orifice having a second diameter different from the first diameter; and an actuator responsive to a voltage signal for causing material to be ejected from the crucible through the orifice area, causing a material droplet of a first predetermined size to be ejected through the first orifice and a material droplet of a second predetermined size to be ejected through the second orifice.

DESCRIPTION

Figure 1:
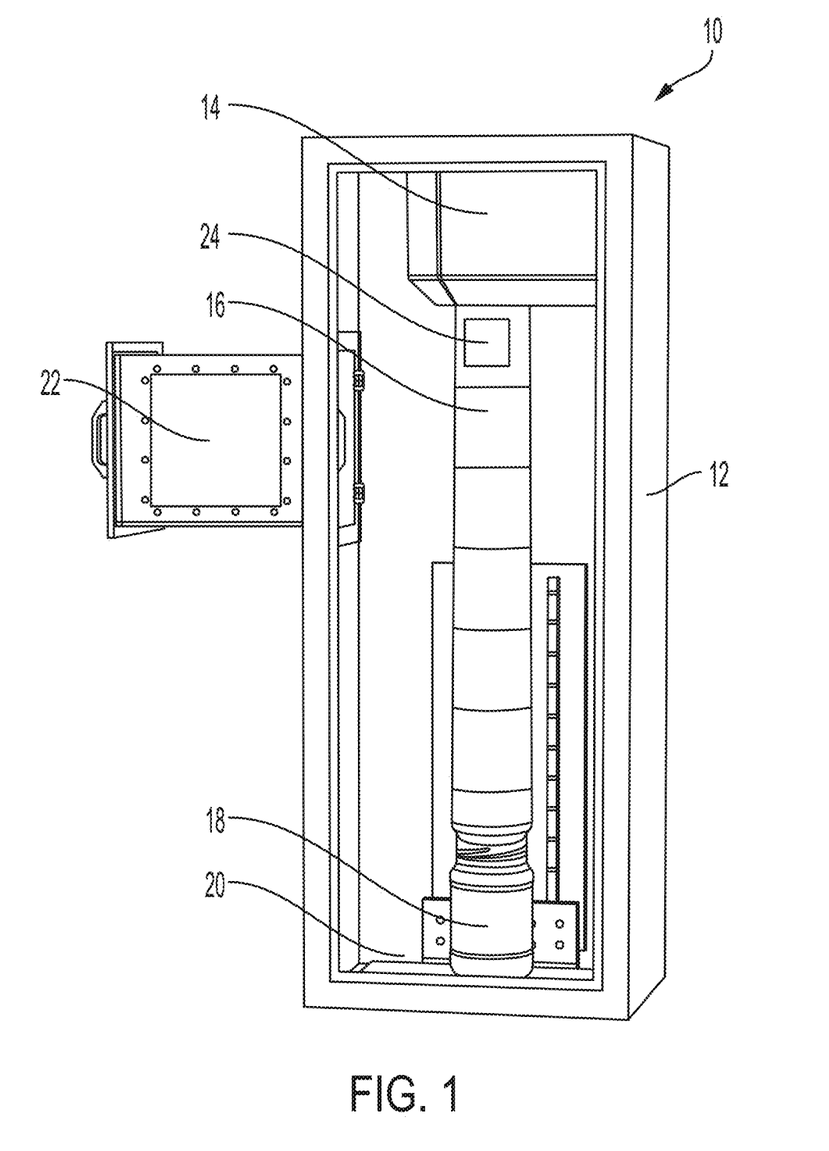
FIGS. 1 and 2 are perspective and sectional views, respectively, of a powder-making apparatus generally indicated as 10.
Figure 2:
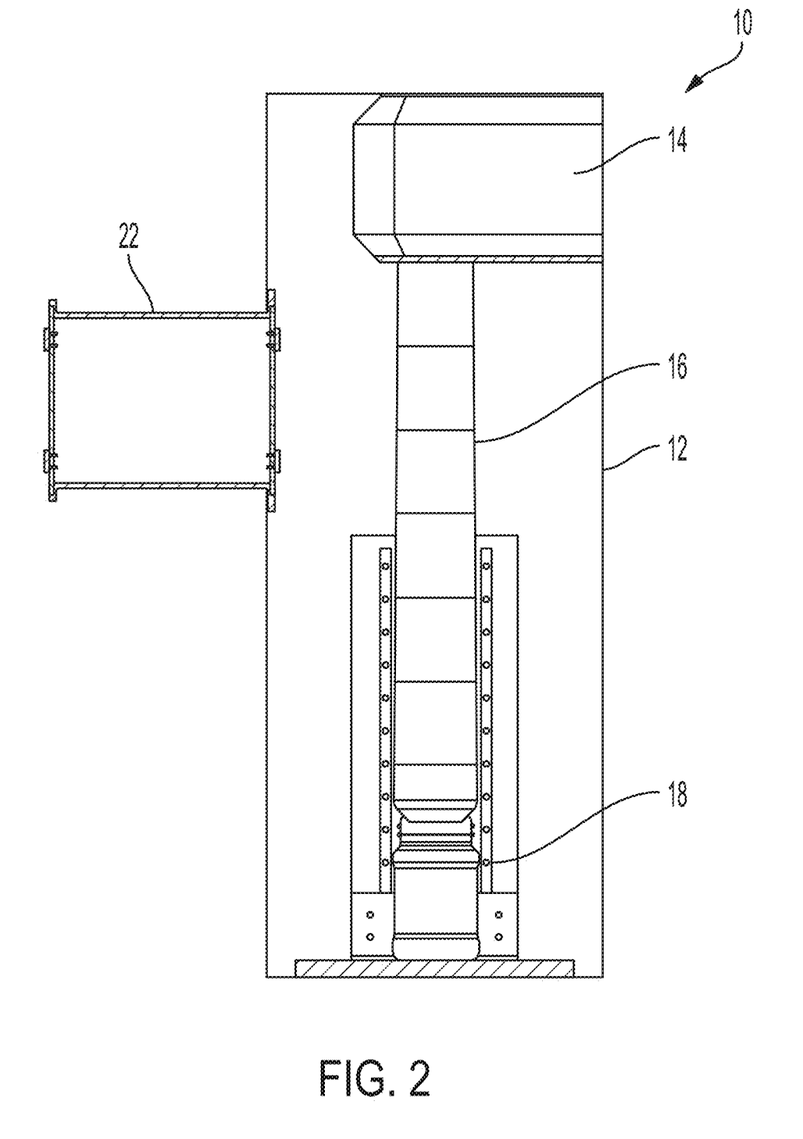

FIGS. 1 and 2 are perspective and sectional views, respectively, of a powder-making apparatus generally indicated as 10. In this Specification, like numerals indicate like elements. The apparatus 10 includes a gas-sealable main inert chamber 12, enclosing a printhead housing 14, which in turn opens into a chute 16 that extends downward to a catch pail 18. The catch pail 18 may be supported by a height-adjustable table 20, while the chute 16 may be of telescoping construction; in this way the vertical distance between printhead housing 14 and catch pail 18 can be adjusted as needed. In a practical embodiment, there may further be provided an airlock-antechamber 22 and a window 24 disposed in chute 16 near the printhead housing 14. In one embodiment of the present disclosure, the distance between the printhead housing 14 and the bottom of the chute 16 where collection occurs is 50 inches.

Figure 3:
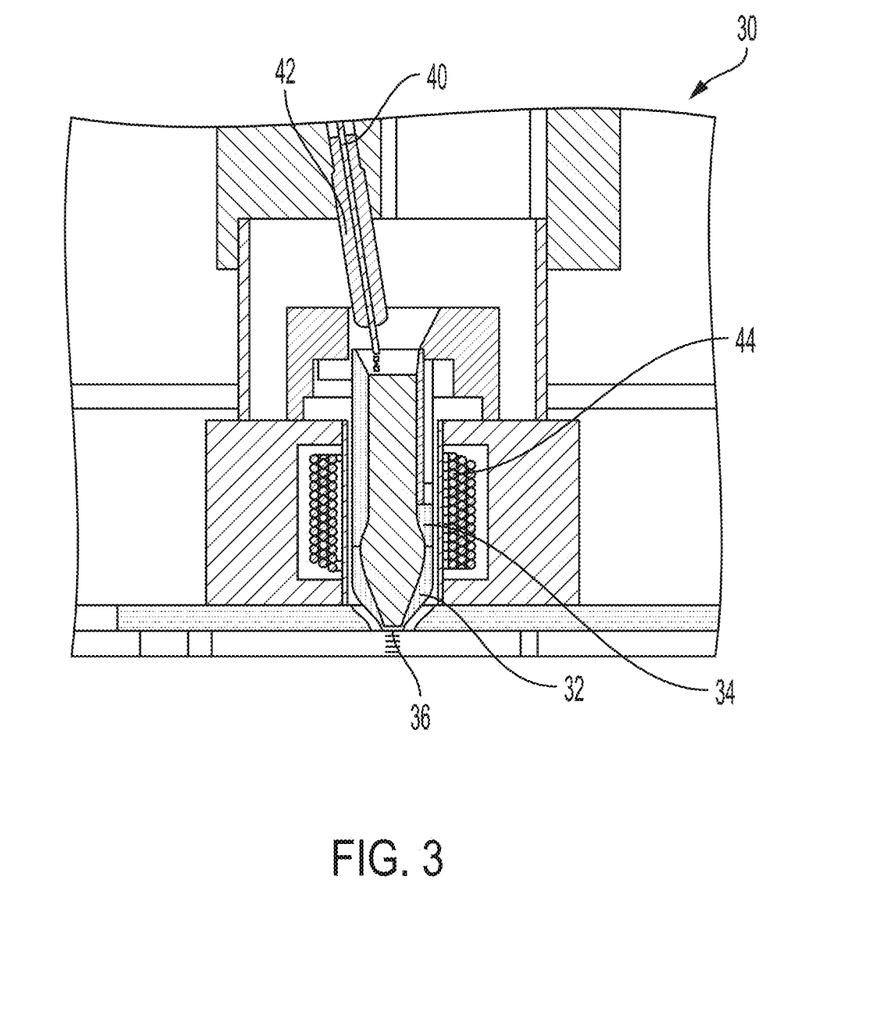
FIG. 3 is a cross-sectional view showing a detail of a single ejector.

FIG. 3 is a cross-sectional view showing a detail of a single ejector 30, as would be disposed in printhead housing 14, at the top of chute 16. In overview, droplets of molten material from ejector 30 are "shot" downward though chute 16, where the droplets cool in the presence of an inert gas such as argon and solidify into spherical powder particles by the time they land in catch pail 18.

The structure of an ejector 30 in the present embodiment is that of a magnetohydrodynamic (MHD) ejector. The operation of such an ejector is described in detail in U.S. Pat. Nos. 9,616,494 and 10,040,119; and the specific configuration shown in those patents could be used in a practical embodiment as well. With regard to the FIG. 3 embodiment, there is provided a lower crucible 32 and upper crucible 34, which together form an open-topped cavity defining an orifice area 36 at the bottom thereof, which will be described in detail below.

Feeding into the top of the cavity formed by lower crucible 32 and upper crucible 34 is a feed wire 40 made of a conductive material such as a pure metal or alloy (hereinafter simply "the material"), entering the top of the cavity through a tubular fitting 42. As described in the cited patents, the material is maintained in liquid form, such as at 850 degrees Celsius in the case of aluminum, as a pool in the cavity until ejected in droplet form through orifice area 36. Ejection is performed by creation of Lorentz forces created in the pool of material by electromagnetic forces via a coil 44, which in turn is associated with a control system (not shown) applying electrical voltage pulses thereto, generally in the manner described in the cited patents.

Figure 13:
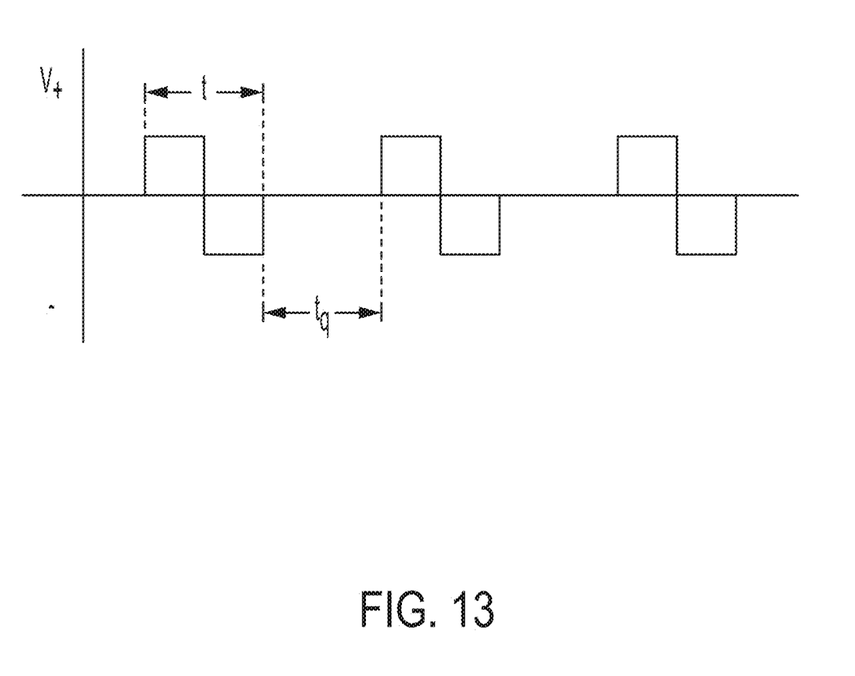
FIG. 13 is a graph showing a possible train of signals that can be applied to the coil such as shown in FIG. 3.

FIG. 13 is a diagram showing a signal train that could be applied to the coil 44 to cause ejection of droplets through orifice area 36 to form powder particles. As can be seen, in one embodiment each signal is a square wave pulse with positive voltage phase followed by a negative voltage phase, with a period t. For the creation of droplets, a quiet period shown as $t_q$ is provided without voltage between each pulse. This quiet period provides time for the meniscus of a droplet in an orifice to settle.

In one practical embodiment of the present disclosure, a pulse rate is 400 Hz with a peak pulse current of ~1200 amperes; the diameter of the droplets/beads achieved in this embodiment is 1250 microns. For the production of droplets to form powders, one practical implementation has been able to operate at voltages V in a range of 100V to 700V; current in a range of 100 A to 2000 A; and a time duration of at least a positive portion of a square wave of 5 to 400 microseconds. Broadly speaking, the two most significant inputs of a voltage signal affecting the resulting droplet/particle size are the voltage and the time duration of the pulse.

The ejected droplets, in one embodiment, could be caught in a liquid in catch pail 18 to achieve a high cooling rate or to dampen impact of the droplets when caught. Other methods, such as forcing inert gas upward to slow the droplets fall or a slide to redirect the beads, are contemplated within the present disclosure.

Figure 4:
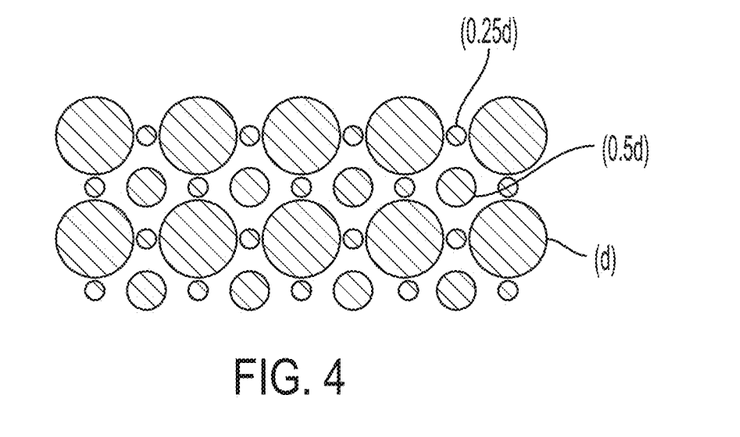
FIG. 4 shows a microscopic sample of a desirable distribution of powder particles.

The above-described apparatus can be used to eject molten material as droplets and form spherical powder particles. For the purposes of creating metal powders useful for powder-bed fusion, as mentioned above (but for other industrial purposes as well), it is desirable to produce a powder having a predetermined proportion of particles of different sizes, such as constrained into relatively narrow ranges. In the case of powder-bed fusion, FIG. 4 shows a microscopic sample of a desirable distribution of powder particles, shown as circles representing spheres. It can be seen that relatively large particles of diameter d will, by themselves, leave undesirable large spaces or voids between them. To fill these spaces, smaller particles, such as having diameter 0.5d, can be intermixed with the larger particles to fill those voids. In turn, even smaller particles, such as having diameter 0.25d, can be intermixed to fill up the even-smaller voids among the d and 0.5d particles.

Figure 5:
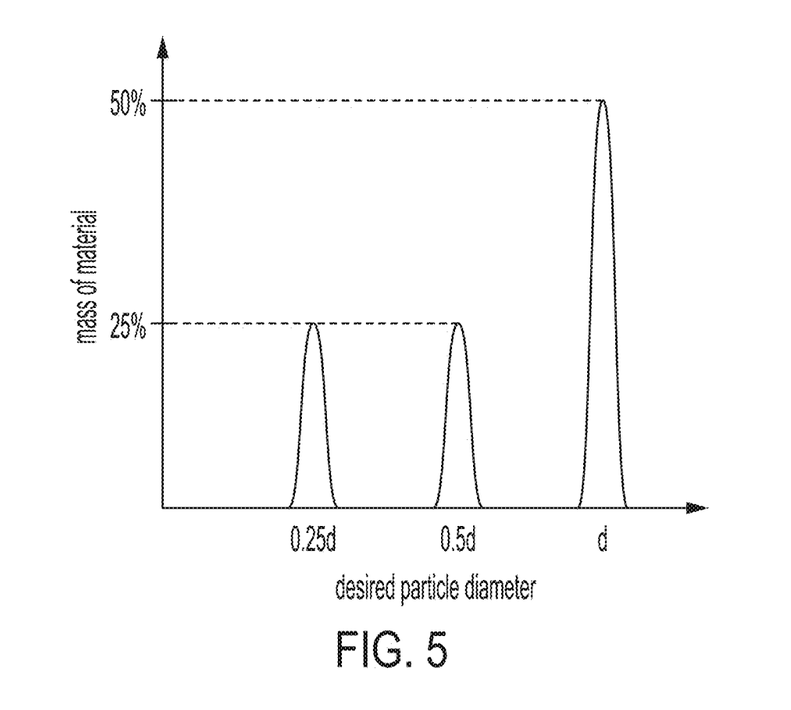
FIG. 5 is a histogram showing an example multi-modal distribution of particles to be created.

FIG. 5 is a histogram showing an example multi-modal distribution of particles to be created, to yield a desirable packing of particles such as shown in FIG. 4 (of course a precisely-defined desirable distribution will depend on many factors for a given objective). As shown in FIG. 5, by mass, the d particles will make up 50% of a powder sample, while the 0.5d and 0.25d particles will make up 25% of the sample each.

A powder-making apparatus as described above can be designed and operated to yield a powder sample having a multi-modal distribution of particle size such as shown in FIG. 5. To obtain this multi-modal distribution, the apparatus can employ, singly or together, two strategies: (1) multiple orifices in orifice area 36; and (2) precise control of pulses to the coil 44.

Figure 6:
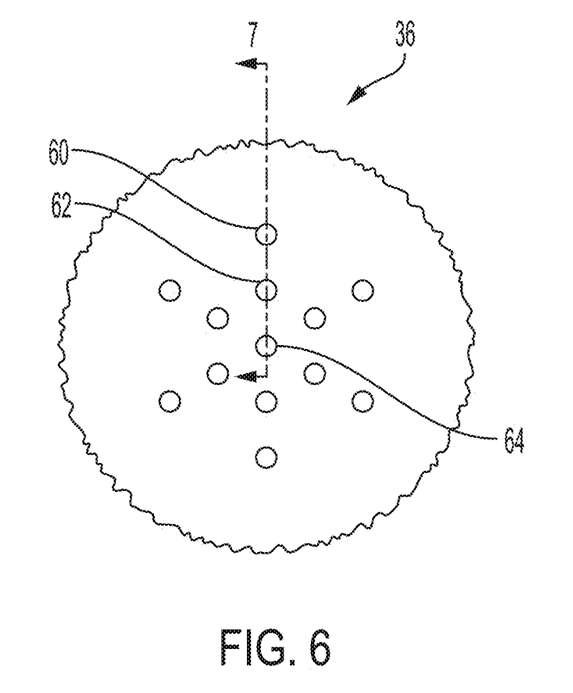
FIG. 6 is a view upward toward the "orifice area" at the bottom of a lower crucible.

FIG. 6 is a view upward toward the "orifice area" 36 at the bottom of the lower crucible 32 forming the cavity in the ejector 30 in FIG. 3. As can be seen, the orifice area 36 defines a plurality of orifices such as 60, 62, and 64. Operation of the ejector 30 can cause ejection of molten material through all of the orifices in orifice area 36 effectively simultaneously; that is, a single pulse applied to the coil 44 will cause at least one droplet of material to be emitted through multiple orifices. Broadly speaking, the diameter of each orifice such as 60, 62, and 64 will directly affect the diameter of the droplets passing therethrough, and thus the diameter of the resulting powder particles received in catch pail 18.

Figure 7:
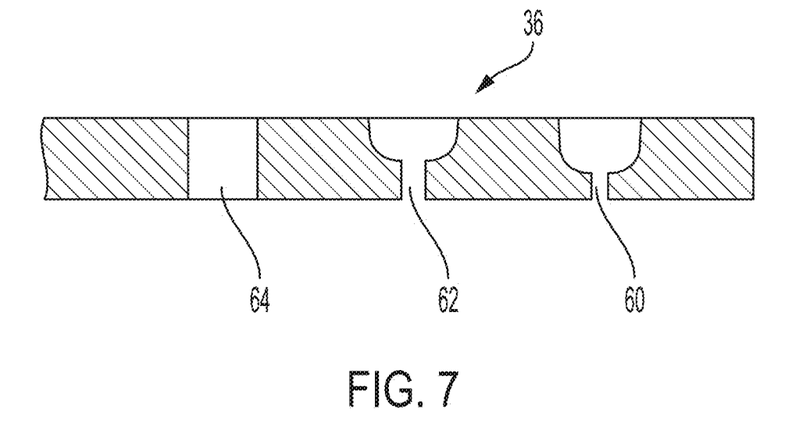
FIG. 7 is a cross-sectional view through line 7-7 of FIG. 6, showing different possible diameters of orifices.

By providing an orifice area 36 of a single ejector 30 with a set of orifices of multiple predetermined diameters, a single orifice area can be made to produce droplets and resulting particles with a desired distribution of sizes. FIG. 7 is a cross-sectional view through line 7-7 of FIG. 6, showing different possible diameters of orifices 60, 62, 64. Roughly, the diameter of each orifice corresponds to one desired particle size; the number of orifices of a given diameter can relate to a desired proportion of particles of that size.

As shown in the cross-section of FIG. 7, in a practical embodiment, it may be desirable, from the perspective of forming spherical particles and droplets, to have the effective thickness of the structure forming each orifice 60, 62, 64 in orifice area 36 be comparable (i.e., roughly equal) to the diameter of the orifice. One approach to obtaining such local thicknesses is to provide a countersink, such as shown with orifices 60 and 62, so the thickness of each orifice at its "lip" is comparable to the diameter thereof. The countersink can be formed on the inner surface of the orifice area, or the outer surface, or some other contour may provide the condition.

Figure 8A:
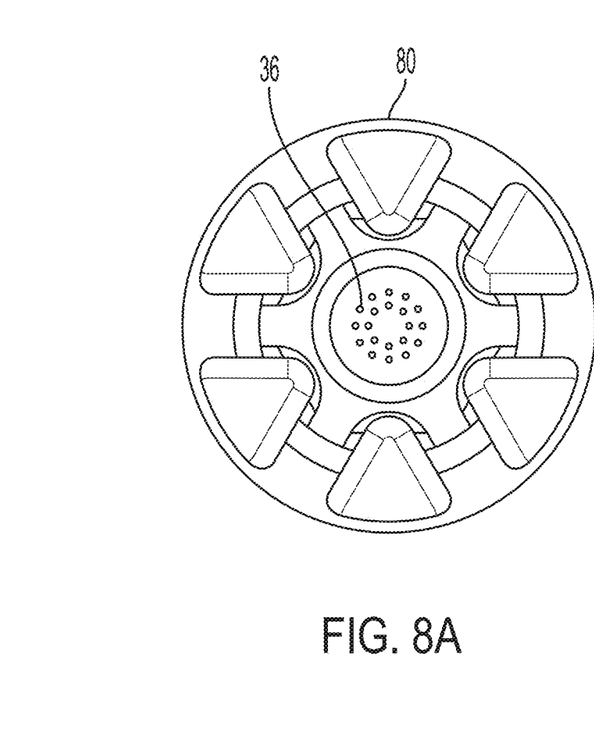
FIGS. 8A and 8B show a removable nozzle, in isolation, with a structure defining an orifice area.
Figure 8B:
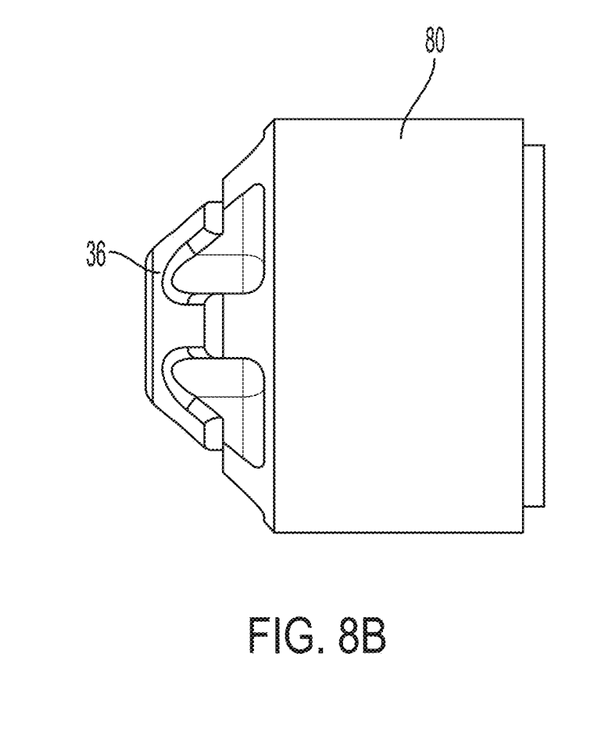

In various practical embodiments, the orifices in orifice area 36 can be formed integrally with the crucible holding the molten material, such as lower crucible 32 in FIG. 3. In another approach, different removable nozzles, each forming the structure of an orifice area 36 with a specific distribution of orifice sizes can be provided, and installed, such as with a screw mount or other fixture, for removable attachment to the lower crucible or other structure. FIGS. 8A and 8B show a removable nozzle 80, in isolation, with a structure defining an orifice area 36. With removable nozzles, a single fixture such as 10 in FIGS. 1 and 2 can be readily adapted for producing different desired mixtures of particle sizes. Also, although the various orifices in orifices area 36 are shown in a radial arrangement, other arrangements, such as a grid or other array, are possible.

Another approach for obtaining metal particles of a desired size or size distribution is to manipulate the pulse signals to coil 44. In one practical embodiment, a pulse in the form of a largely square wave, having a positive phase and a negative phase, will cause ejection of a quantity of molten material through the orifice area 36. Broadly, a larger duration or amplitude of the pulse will yield a larger droplet and resulting particle. Assuming a uniform diameter of orifices in orifice area 36, with any given design of ejector, the amplitude or duration of pulses can be adjusted to obtain a desired particle size within a practical range.

Figure 9:
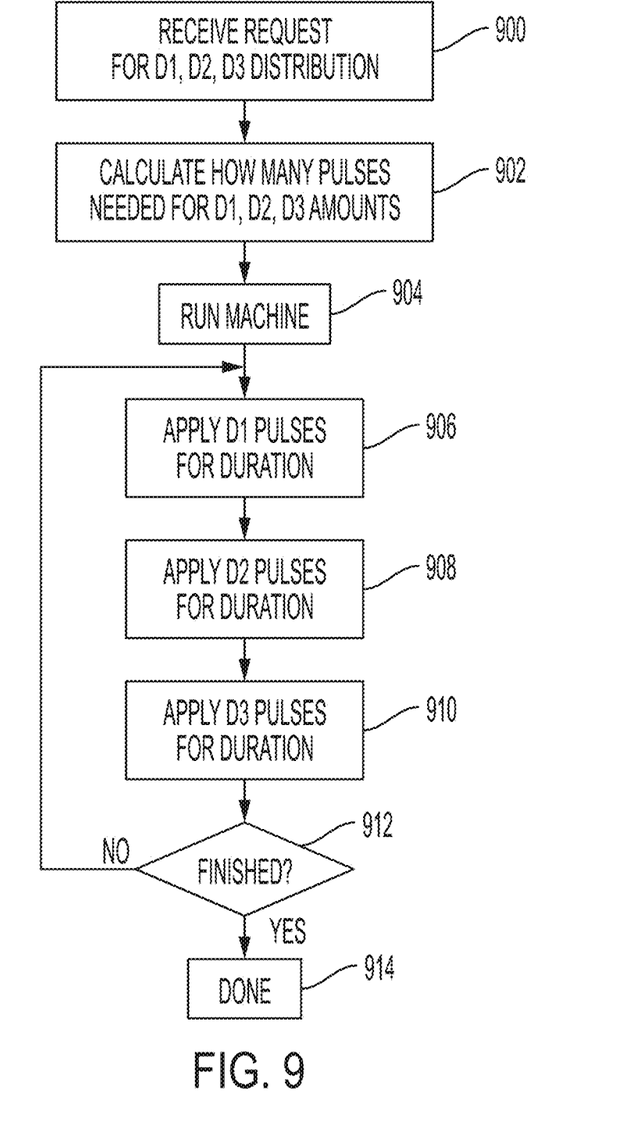
FIG. 9 is a flowchart showing the operation of a control system of hardware such as shown in FIGS. 1-3 to obtain a mixture of three different particles.

If it is desired to obtain a sample of metal powder with a desired distribution of particle sizes, as is useful in powder-bed fusion, it is possible to make a single, largely-premixed sample directly in catch pail 18 in FIG. 1 or 2 in a single operation. FIG. 9 is a flowchart showing the operation of a control system of hardware such as shown in FIGS. 1-3 to obtain a mixture of three different particles D1, D2, D3 (which may conform, for instance, to the histogram of FIG. 5), if it is known, such as by design and/or experimentation, what duration and amplitude of a pulse will yield a particle of the desired diameter.

At step 900, a control system or external general-purpose computer operative of the machine 10 receives a request for a sample, to be collected in catch pail 18, of fairly well-mixed particles D1, D2, D3 of predetermined desired diameters. At step 902 there can be calculated how many pulses would be required (again, based on design and/or experimentation) to make absolute desired amounts of each type of particle with the machine, to obtain the desired mixture. Then the machine is run (starts ejecting material from ejector 30) at step 904.

To obtain a mixture of particles of different diameters, approaching the even spatial distribution shown in FIG. 4, it is possible to "cycle through" sequential and repeated ejection of different-sized particles D1, D2, D3 for brief periods or durations of time, so that these particles to some extent mix together as the catch pail 18 is filled, as shown at steps 906, 908, 910. These brief durations of time where each particle size is sequentially made can last from less than a second to several seconds: changing ejection of different-sized particles is simply a matter of changing the pulse train to coil 44. With each cycle, such as shown at 912, there can be a check (a cycle count and/or direct weighing of output in catch pail 18) until the job is completed, as at step 914.

The two overall techniques described for obtaining particles of a desired size, use of differently-sized orifices and different types of pulses, can be used together, to yield a system capable of producing a mixture having a large number of discrete modes of particle sizes.

Figure 10:
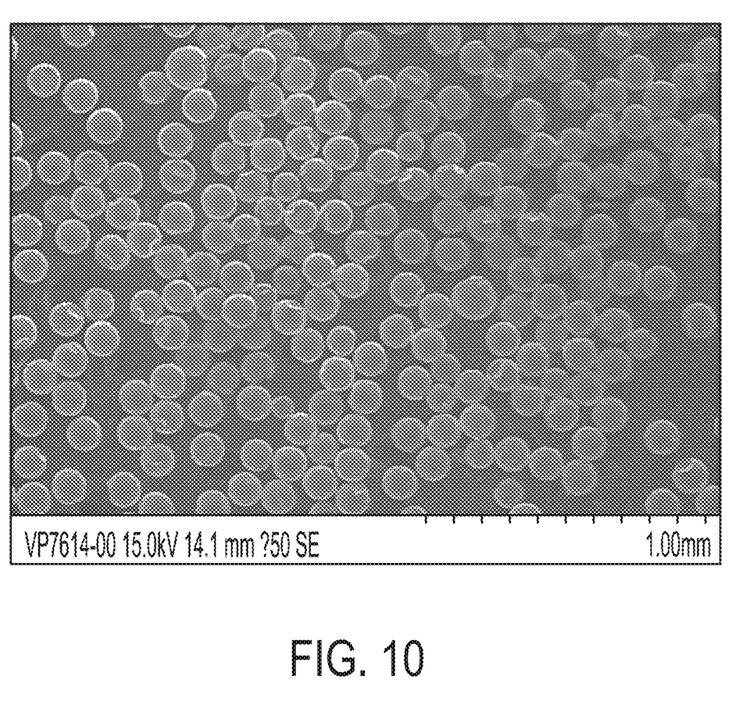
FIGS. 10 and 11 are photo-micrographs of spherical beads of metal made with hardware of a type as described herein.
Figure 11:
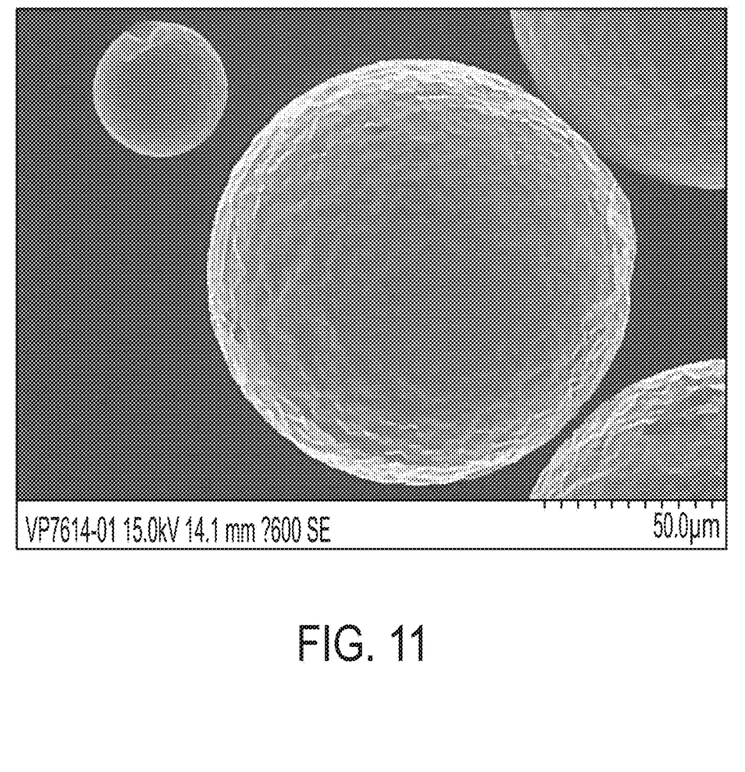

FIGS. 10 and 11 are photo-micrographs of spherical beads of metal made with hardware of a type as described herein, having a nearly spherical shape where the actual beads measure approximately 0.98 in circularity. These metal beads can range in size between 700-20 μm.

Figure 12:
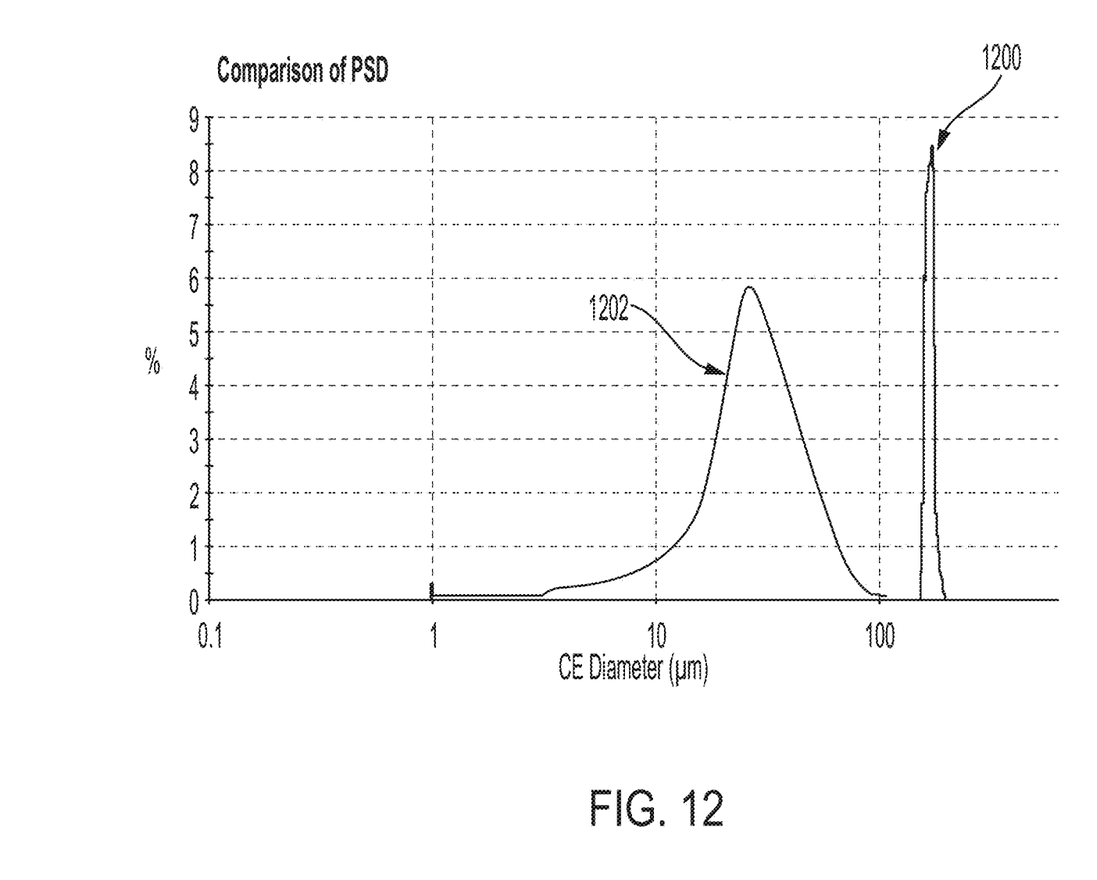
FIG. 12 is a histogram of circularity and particle size for one implementation of hardware of a type as described herein.

FIG. 12 is a histogram of circularity and particle size for one implementation of hardware of a type as described herein. Bell curve 1200 reflects metal particles made with hardware as described herein, while bell curve 1202 reflects a commercially-available powder, Inconel 625, made by other means. All magnified pictures and plots of circularity and particle size distribution (PSD) were taken from the results of testing provided by Oak Ridge National Labs (ORNL). With regard to the present disclosure, the natural yield of beads does not require filtering as do other methods since the distribution of the bead yield in diameter is relatively small. Hardware according to present disclosure has been shown to produce 98.6% sphericity.

As used herein, terms such as "optimal," "minimize," or "maximize" should be understood broadly, and not construed as requiring any mathematically-provable optimization.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method of operating an ejector to form solid spherical particles of a metal powder, the ejector having a crucible configured to retain molten metal material, structure associated with the crucible including a single orifice area defining one or more orifices, and an electrical coil responsive to a voltage signal to produce Lorentz forces in a portion of the molten metal material to be ejected from the crucible, comprising:
   applying a voltage signal of a first type to the electrical coil to produce Lorentz forces in the portion of the molten metal material and eject droplets of a first predetermined size from the crucible through the one or more orifices of the single orifice area;
   applying a voltage signal of a second type to the electrical coil to produce Lorentz forces in the portion of the molten metal material and eject droplets of a second predetermined size from the crucible through the one or more orifices of the single orifice area, the first predetermined size being different than the second predetermined size; and
   catching in a same receptacle solid spherical particles having different diameters that were formed by the molten material droplets of the first predetermined size and the second predetermined size after the molten metal material droplets of the first predetermined size and the second predetermined size have solidified by traveling a predetermined distance from the single orifice area, the caught solid spherical particles forming the metal powder in the same receptacle.

2. The method of claim 1, the voltage signal of the first type and the voltage signal of the second type differing by at least one of amplitude and duration.

3. The method of claim 1, each of the voltage signal of the first type and the voltage signal of the second type include a quiet period adequate to provide time for a meniscus in the one or more orifices of the single orifice area to settle.

4. The method of claim 1, further comprising:
   receiving a request, prior to operation of the electrical coil, for the ejector to create a predetermined amount of a mixture of droplets of the first predetermined size and the second predetermined size.

5. The method of claim 4, further comprising:
   calculating how many voltage signals of the first type and voltage signals of the second type are required to create the predetermined amount of the mixture of droplets.

6. The method of claim 1, further comprising:
   applying the calculated number of the voltage signal of the first type to the electrical coil during a first duration; and
   applying the calculated number of the voltage signal of the second type to the electrical coil during a second duration, the first duration being different than the second duration.

7. The method of claim 6, further comprising:
applying each voltage signal of the first type to the electrical coil during the first duration sequentially;
applying the voltage signal of the second type to the electrical coil during the second duration sequentially; and
repeating the application of the calculated number of the voltage signal of the first type to the electrical coil sequentially followed by the application of the calculated number of the voltage signal of the second type to the electrical coil sequentially.

8. The method of claim 1, wherein the single orifice area defines the one or more orifices as a plurality of orifices, whereby the application of the voltage signal of the first type and the application of the voltage signal of the second type causes ejection of at least one molten metal material droplet from each orifice in the plurality of orifices.

9. The method of claim 8, wherein the single orifice area defines at least one orifice in the plurality of orifices with a first diameter at an end of the at least one orifice from which the molten metal material droplet is ejected and the single orifice area defines at least one other orifice in the plurality of orifices with a second diameter at an end of the at least one other orifice from which the molten metal material droplet is ejected, the first diameter being different than the second diameter.

10. The method of claim 1, the molten metal material comprising molten pure metal.

11. The method of claim 1, the molten metal material comprising a molten metal alloy.

12. The method of claim 1, further comprising:
causing the molten metal material droplet to be ejected into pure inert gas as the molten metal material droplet travels at least a portion of the predetermined distance.

* * * * *